July 3, 1951          E. J. DILLMAN          2,558,937

AIR CONDITIONING SYSTEM AND APPARATUS

Filed Feb. 19, 1945          4 Sheets—Sheet 1

INVENTOR.
Earnest J. Dillman
BY
Andrew K. Fouldo
his ATTORNEY

July 3, 1951         E. J. DILLMAN         2,558,937
AIR CONDITIONING SYSTEM AND APPARATUS
Filed Feb. 19, 1945                 4 Sheets-Sheet 2
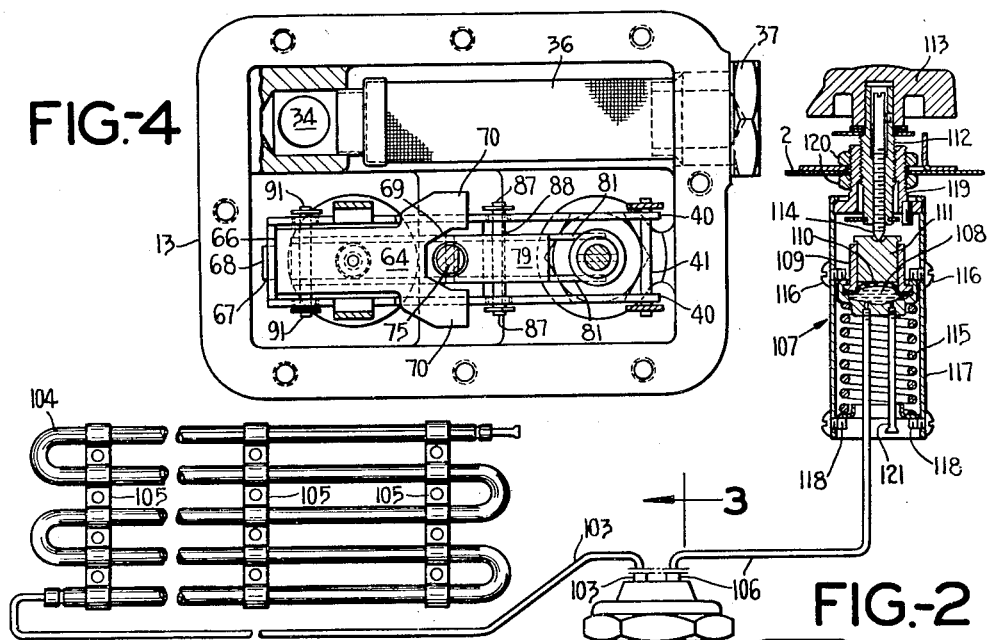
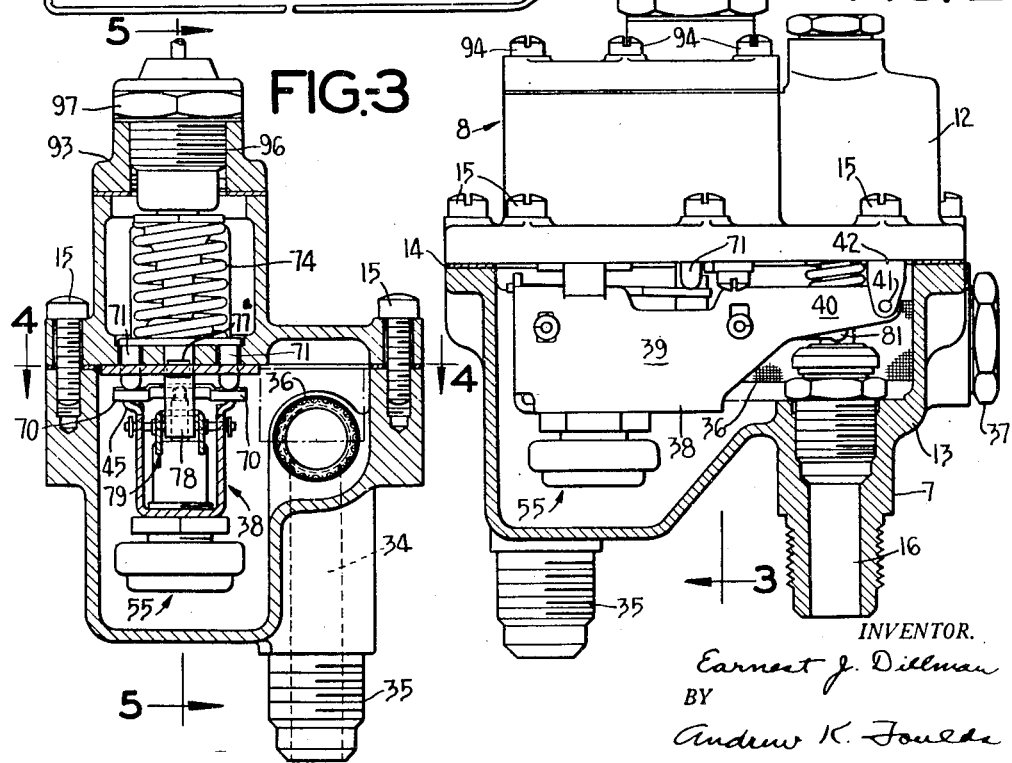
INVENTOR.
Earnest J. Dillman
BY
Andrew K. Foulds
his ATTORNEY July 3, 1951 E. J. DILLMAN 2,558,937
AIR CONDITIONING SYSTEM AND APPARATUS
Filed Feb. 19, 1945 4 Sheets-Sheet 3

INVENTOR.
Earnest J. Dillman
BY
Andrew K. Foulds
his ATTORNEY

Patented July 3, 1951

2,558,937

UNITED STATES PATENT OFFICE 2,558,937

AIR CONDITIONING SYSTEM AND APPARATUS

Earnest J. Dillman, Detroit, Mich., assignor to Detroit Lubricator Company, Detroit, Mich., a corporation of Michigan Application February 19, 1945, Serial No. 578,669

19 Claims. (Cl. 236—1)

This invention relates to new and useful improvements in an apparatus and system for air conditioning and more particularly to a control valve for regulating the flow of a heat transfer medium to a conditioning unit, for example.

An object of the invention is to provide such a valve in which automatic change over means accommodates the valve for controlling the flow of either a heating or cooling medium.

Another object is to provide a valve in which the valve member may have its direction of operation reversed relative to a single direction of movement of a valve operating member.

Another object is to provide means responsive to the temperature of the medium flowing through and controlled by the valve to control the direction of valve member movement relative to increasing temperature of a medium external of the valve.

Another object is to provide a valve having a single flow port and cooperable valve member automatically controlled to provide regulation of either a heating medium or cooling medium supplied to the valve.

Another object is to provide means for adjusting the response of the valve to the temperature of the air to be conditioned.

Another object is to provide a temperature operated valve having a single port and valve member controlling the flow of both cooling and heating medium.

Another object is to provide means for independently adjusting the position of the valve member for a given space temperature when controlling the flow of either heating or cooling medium.

Figure 1:
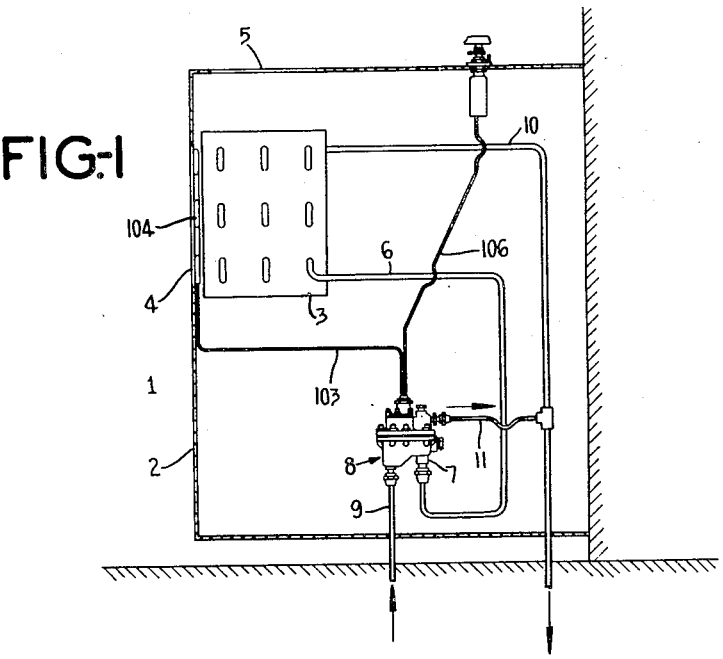
Figure 9:
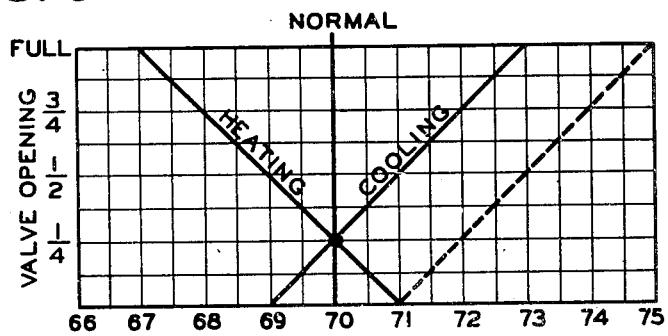
Figure 7:
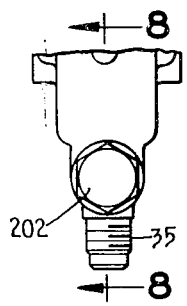
Figure 8:
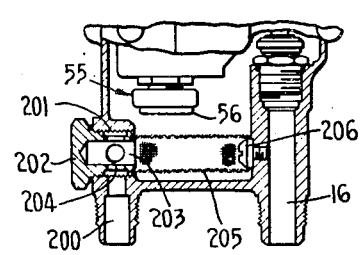
Figure 5:
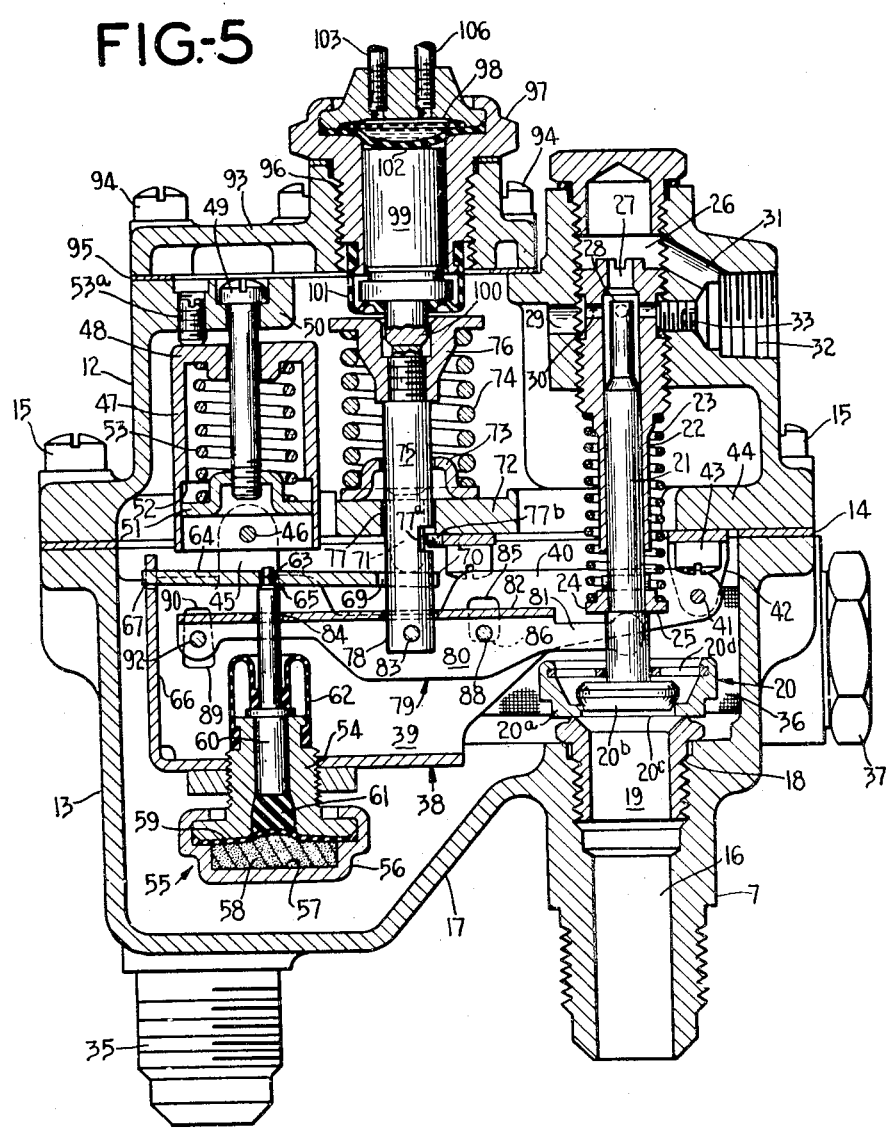
Figure 6:
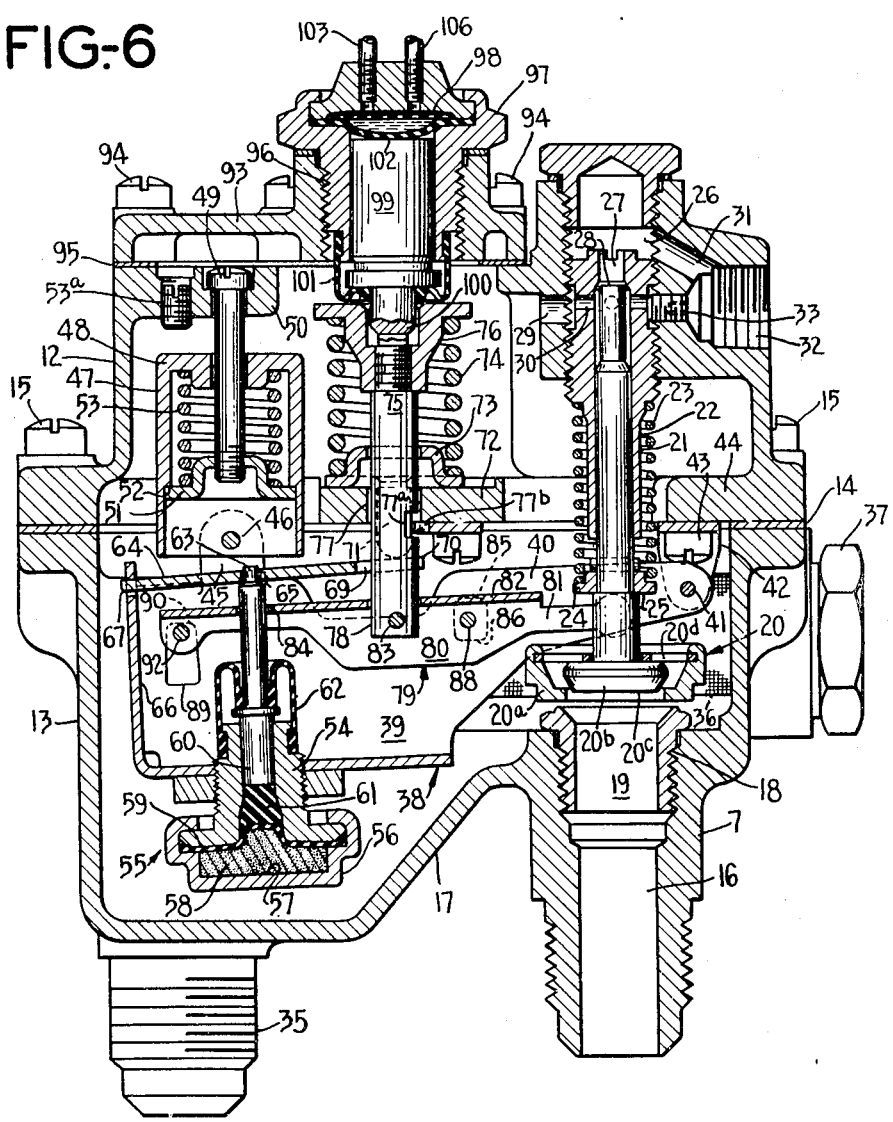

In the accompanying drawings, to be taken as a part of this specification, the invention is fully and clearly illustrated, in which drawings:

Figure 1 is a view of a portion of an air conditioning system showing the cooperative relation of a control valve to the conditioning unit, Fig. 2 is a view in side elevation of the control valve but showing it partly in vertical section and also showing the manual adjusting means in longitudinal central section, Fig. 3 is a view of the control valve in section on line 3—3 of Fig. 2, Fig. 4 is a plan view of the lower valve body portion and showing the internal mechanism on the line 4—4 of Fig. 3, Fig. 5 is a view of the valve in vertical section on line 5—5 of Fig. 3 with the parts positioned for summer or cooling operation, Fig. 6 is a view similar to Fig. 5 but showing the parts positioned for winter or heating operation, Fig. 7 is a detail end view of an alternative form of valve housing, Fig. 8 is a view in section on line 8—8 of Fig. 7, and Fig. 9 is a chart showing the relation of valve opening or position to the temperature of the space to be conditioned.

Referring to the drawings by characters of reference, 1 designates generally a room or space, the air of which is to be conditioned or tempered and containing an air conditioning unit 2 having a heat exchange coil 3 positioned therein. The casing of unit 2 has an air inlet opening 4 for flow of room air into the casing and over the coil 3 to be tempered thereby. An outlet opening 5 is provided in the top wall of the unit 2 for discharge of the tempered air back into the conditioned space. The coil 3 which is preferably of the fin type is supplied with heat transfer medium such as hot or cold water by a pipe or conduit 6 leading from the outlet 7 of a control valve 8 to which the medium or water is supplied by inlet pipe or conduit 9. The water supplied to the pipe 9 is heated or cooled by any suitable apparatus. A return pipe or conduit 10 leads from the coil 3 and preferably is connected back to the source of supply of water to the pipe 9 so that a circuit is provided. The system is provided with a by-pass pipe 11 which leads from the control valve 8 and connects to the return pipe 10 thereby by-passing or short circuiting the coil 3.

The control valve 8 has a two-part casing comprising an upper body member 12 and a lower body member 13 which are hollow and have horizontal or abutting surfaces sealed by a gasket 14 and tightly clamped together by screws 15. The bottom member has an outlet passage 16 through the outlet 7 and which is connected to the coil supply pipe 6. The passage 16 has at its upper end which opens through the bottom wall 17 of the casing bottom or lower member 13, a valve seat member 18 providing an outlet port 19 with an upward facing valve seat. Cooperable with the valve seat and controlling flow through the port 19 there is a valve member 20 of the disc type carried by a vertically reciprocal valve stem 21 which extends upward into a tubular guide member 22. The valve member 20 is preferably of a double valve construction having a main valve portion 20ᵃ and a supplemental or pilot valve portion 20ᵇ which cooperates with a valve port 20ᶜ through the main portion 20ᵃ. The pilot valve member 20ᵇ is limited in its open movement relative to its port 20ᶜ by a spider or ported disc member 20ᵈ carried by the portion 20ᵃ and having a central aperture therethrough through which the stem 21 freely passes. Surrounding the guide member 22 there is a helical coil spring 23 which seats its upper end against a downward face on the guide member and which seats at its lower end on a collar 24 surrounding the stem 21 and resting on an upward facing stem shoulder as at 25. The guide member 22 extends upward into and is adjustably screw-threaded and supported in an internally screw-threaded passageway 26 in the top wall of the upper body member 12. The bore of the guide member 22 opens at its upper end into the passageway 26 and has its upper end portion of reduced diameter or cross section as at 27 to provide a by-pass outlet port with which cooperates a plug type metering valve member 28 on the upper end of the valve stem 21. Inlet to the port 27 is through a passage 29 in the casing top wall and cooperable radial ports 30 in the guide member 22. The port 27 discharges into the chamber 26 from which leads an outlet passage 31 having an internally screw-threaded outlet 32 to which the by-pass pipe 11 is connected. A set screw 33 accessible through the passage end portion 32, cooperates with the guide member 22 to lock the guide member in adjusted position to determine the movement of the stem 21 which will close the port 27. The heat transfer medium or water is supplied to the interior of the valve casing through a passage 34, see Fig. 3, having its inlet end 35 connected to the supply pipe 9. The passageway 34 opens into a horizontally positioned cylindrical strainer 36 which is carried by a screw cap 37 screw-threaded through the side wall of the casing bottom member 13, see Fig. 4.

Positioned within the bottom member 13 there is a trough-shaped supporting or fulcrum member 38 in the form of a lever having side members 39 with end extensions 40 which straddle and pass on opposite sides of the stem 21 being laterally spaced for clearance of the valve member 20. The free ends of the extensions 40 are apertured to pivotally receive a fulcrum shaft 41 which is carried by down turned ears or flanges of a bracket 42 secured by screws 43 to the under face of an inward directed horizontal flange 44 on the top member 12. Adjacent the other or free end of the lever 38 the side members 39 have upward extending ears or flanges 45 which are pivotally secured by a pin or pivot 46 which extends through diametrically opposite points in the side wall of a cylinder 47 adjacent its open lower end. The cylinder 47 has an upper end wall 48 which is centrally apertured for guiding sliding movement on an adjustable supporting rod or screw 49 carried by a bracket or flange 50 extending horizontally within the casing top member 12. Adjustably screw-threaded on the lower end of rod or screw 49 there is a disc 51 which is engageable with a downward facing internal shoulder 52 in the cylinder 47 and which by engagement with the disc 51 limits downward movement of the cylinder 47. Positioned between the disc 51 and the cylinder end wall 48 there is a helical coil spring 53 under compression and normally urging upward the cylinder 47 and its connected lever 38. Upward movement and the upward position of the lever 38 is determined by an adjustable stop screw or abutment member 53ᵃ screw-threaded through the flange 50 and positioned for engagement by the top face of the cylinder end wall 48.

The bottom wall or flange of the lever 38 substantially in line with the supporting rod 49 has an aperture therethrough in which is adjustably screw-threaded and supported the upper casing portion 54 of a temperature responsive power unit 55 having a lower casing portion 56 containing a chamber 57 filled with an expansible contractable temperature responsive material 58 which is sealed in the chamber 57 by a pressure responsive diaphragm member 59 of Ameripol or the like. The upper casing portion 54 has a vertical guide bore therethrough in which is positioned a piston or thrust rod 60 which seats at its lower end on a plug 61 also of Ameripol and which seals the guide bore and transmits movement from the diaphragm to the thrust rod 60. A power unit of this type is more fully described in the patent to Vernet, 2,368,181, granted January 30, 1945, for Sealing Means. The thrust rod 60 projects from the casing part 54 and extends upward between the lever side members 39. A cap member 62 of flexible material such as Ameripol is preferably provided to seal the upper end of the piston bore in the portion 54 against the admission of water from the interior of the valve casing. The thrust member terminates at its upper end in a reduced end portion 63 which is received in a locating aperture in a lever plate 64 and which provides an upward facing shoulder for abutting engagement of the rod 60 with the under face of the plate 64 as at 65. The plate 64 has one end hinged or pivotally connected to an upright flange or wall 66 at the free end of the lever 38 as at 67. This hinge connection is formed by a tongue portion 68 on the plate 64 which extends through a horizontal slot in the upper end portion of the lever flange 66, see Fig. 4. The other end of the plate 64 has an end slot 69 providing spaced arms 70 which bear upward against overlying spaced abutment pins 71. The pins 71 extend upward through and are slidable in vertical guide apertures in a bridge or flange portion 72 rigid with the top member 12 and are rigidly secured at their upper ends in the horizontal flange of a spring seat or abutment member 73 which is limited in downward movement by the portion 72. The abutment member 73 receives and locates the lower end of a helical coil spring 74 which extends upward around a reciprocal rod 75 and is compressed by engagement at its upper end with a seat or abutment member 76 fixed on rod 75. The spring 74 provides for lost motion movement of the power unit rod 60 upon over expansion of the material 58. The rod 75 extends downward through a central aperture through the abutment member 73 and through a guide aperture 77 in the bridge portion 72. The rod 75 has a side recess 77ᵃ providing upper and lower spaced stop shoulders cooperable with a stop plate 77ᵇ secured rigidly to the portion 72 so as to limit up and down movement of the rod 75. The lower end portion 78 of the rod 75 terminates between the lever side members 39 and passes freely through the plate end slot 69. Positioned between the side members 39 there is an operating lever 79 having down turned side flanges 80 substantially parallel to the side members 39 and having end extensions or arms 81 which terminate in circular end portions at opposite sides of the stem 21 for upward engagement with the under face of the stem collar 24. The base flange or web 82 of the lever 79 has an enlarged aperture therethrough which the rod end portion 78 freely passes so that the lever 79 can tilt or rock relative to the rod 75. A shaft or pivot pin 83 extends through the flanges 80 and the rod end portion 78 and supports and secures the lever 79 on and to the rod 75. The web 82 is also provided with an enlarged aperture 84 through which the power unit thrust rod 60 freely extends such that the lever 79 can tilt freely without hindrance by the rod 60. Longitudinally of the levers 79 and 38 and between the thrust rod 75 and the stem 21 they are provided with cooperable fulcrum means. The side members 39 have oppositely positioned elongated or apertured slots 85 therethrough with horizontal bottom edges 86 providing fulcrum or bearing surfaces. Vertically shiftable in the slots 85 and engageable with the fulcrum wall surfaces 86 are the trunnion end portions 87, see Fig. 4 of a fulcrum shaft or rod 88 which is secured in and through the operating lever side flanges 80. At the end of the operating lever 79 opposite the arms 81, the operating lever 79 and the supporting lever 38 have cooperable fulcrum means positioned on the opposite side of the rod 75 from the stem 21. At opposite points through the side lever members 39 there are vertically elongated apertures or slots 89 having upper end horizontal edges or surfaces 90 which receive for upward bearing engagement the trunnion end portions 91 of a fulcrum shaft or rod 92 which is rigidly secured in and through the operating lever side flanges 80.

Overlying the flange 50 of the top casing member 12 there is a cover portion or member 93 which is rigidly clamped in position by screws 94 and sealed to the casing by a gasket 95. Secured and sealed in an aperture 96 through the cover member 93 and alined vertically with the operating rod 75 is the motor end of a temperature responsive operating means having a casing 97 containing an expansive contractable chamber 98. The casing 97 has a vertically reciprocal piston or plunger 99 which extends downward into the top valve casing member 12 and terminates in a reduced end portion 100 which extends into a recess in the spring abutment member 96 and has abutting engagement with the upper end of the operating rod 75. A flexible cap member 101 of Ameripol or the like is sealed to or tightly engages the casing 97 and the plunger 99 so that liquid in the valve casing is prevented from passing into the plunger guide bore. Within the casing 97 and forming one wall of the chamber 98 there is a diaphragm member 102 which engages the plunger 99 to move it downward against the force of the spring 74. The chamber 98 is connected by a capillary or tube of small bore 103 to a bulb element 104 in the form of a grid of return bends or loops which are spaced and supported by transverse rigid material straps 105. The bulb element 104 and the tube 103 and the chamber 98 are filled solid with a temperature responsive liquid so that the diaphragm 102 and plunger 99 will respond to and will be moved by expansion and contraction of the liquid in accordance with temperature changes to which the bulb element 104 is subjected. The bulb element 104 is positioned as a grid or grill behind the air conditioning casing opening 4 so that the temperature of the air supplied from the space 1 to the coil 3 will control the position and movement of the operating rod 75. Also connected into the chamber 98 there is a capillary or tube of small bore 106 which leads to a manual regulation temperature device 107, opening into an expansive contractable chamber 108 therein. The chamber 108 is contained within a case 109 and has one wall formed by a diaphragm 110 of Ameripol or the like. This wall 110 is engaged by a plunger 111 which is longitudinally adjustable by a manually rotatable screw 112 having a hand grip member 113. The screw 112 is hollow and contains an adjustment screw 114 for initial setting or positioning of the plunger 111. The casing 109 is supported on a lost-motion spring 115 which holds the casing against abutment screws 116 threaded through the side wall of a cylindrical housing 117 of the casing 109. The other end of the spring 115 is supported by an abutment flange which rests on similar abutment screws 118 also screw-threaded through the housing wall. The housing 117 is carried by an internally screw-threaded sleeve 119 in which the screw 112 is adjustably screw-threaded. The sleeve 119 is secured in an aperture through the top wall of the air conditioning unit casing 2 and is clamped therein by lock nuts 120 so that device 107 is supported from the casing 2. The chamber 108 and the tube 106 are also filled with the expansible contractable liquid which fills the chamber 98 so that adjustment of the volume of the chamber 108 will regulate the response of the temperature responsive operation of the rod 75. A sealing tube 121 for charging the chambers 98 and 108 and the tube system is provided.

The mechanism of the control valve is adjusted for system operation as follows:

With the control knob 113 set in its normal or intermediate position so that the chamber 108 is capable of substantially equal collapse or expansion by control knob adjustment and with the bulb element 104 being held at a corresponding intermediate temperature, then the supporting screw 49 and the stop screw 53ᵃ are adjusted to determine the temperatures of the heat transfer medium at which the valve member 20 is closed. As shown, the control valve 20 has been set or adjusted by the screws 49 and 53ᵃ in accordance with the full line heating and cooling curves on the chart, Fig. 9. Referring to this chart it will be noted that the valve member 20 is closed on the heating cycle of the system at a space temperature of 71° F. and is also closed on the cooling cycle of the system at a space temperature of 69° F. From the chart which accords with the showing in Figs. 5 and 6, it will be noted that when the power unit 55 is subjected to cooling medium so that the supporting lever 38 is in its up position with the cylinder end wall 49 against the stop member 53ᵃ that the valve member 20 will have just come to full closed position when the space or room temperature is at 69° F. If there is no change in room or space temperature affecting the bulb element 104 and it remains at 69° F., then when heating medium is supplied to the valve casing in contact with the power unit 55 so that power unit moves the supporting lever 38 to the position of Fig. 6 when the cylinder shoulder 52 engages the stop disc 51, then the fulcrum surface 90 will have engaged the fulcrum shaft 92 to rock the operating lever 79 counterclockwise about its pivotal support 83 thereby moving the valve member 20 to one-half open position. Accordingly, the space temperature affecting the bulb element 104 at which the valve member 20 will just come to full closed position during the heat cycle operation as in Fig. 6 will be as shown on the chart, Fig. 9 at the space temperature 71° F. This positioning of the valve member 20 can be changed by the adjustment screws 49 and 53ª. If it is desired to have the valve member 20 come to closed position at a higher room or space temperature on the cooling cycle of the system, then the screw 53ª is moved downward or extended so that the spring 53 is compressed and the supporting member or lever 38 is moved downward. This adjustment of the screw 53ª will not change the heat curve or opening of the valve member on the heating cycle but will merely shift the cooling curve to say, the position shown in the dash line on the chart, Fig. 9. By retracting the stop screw 53ª the space temperature at which the valve member 20 comes to closed position can be reduced below the space temperature of 69° F. The stop or supporting screw 49 permits of adjustment of the heating curve or valve member operation during the heating cycle and permits this adjustment independently of adjustment of the valve member operation for the cooling cycle which is accomplished by the screw 53ª. Lowering of the stop disc 51 by rotation of the screw 49 will require an increased space temperature affecting the bulb element 104 in order to close the valve member 20, that is, such adjustment will move the heat curve of Fig. 9 toward the right, thus raising the valve closing temperature above 71° F. By rotating the supporting screw 49 so as to lift the stop disc 51, the supporting lever or member 38 will be lifted or rotated clockwise about its shaft 41 during the heating cycle thereby shifting the heating curve of Fig. 9 toward the left and providing for closing of the valve member 20 at a lower space temperature. Adjustment of the manual knob 113 will simultaneously shift both the heating and cooling curves of Fig. 9 without changing the relation of these curves to each other. If the knob 113 is rotated to collapse the chamber 108 and force additional liquid into the motor chamber 98, then the temperatures at which the valve member 20 is moved to closed position will be lowered equally for both the heating and cooling cycles. Conversely, rotation of the knob 113 to permit the spring 74 to force liquid out of the chamber 98 and into the chamber 108 due to retraction of piston 111 will result in a requirement of higher space temperatures for valve member closed position on both the heating and cooling cycles. The stop member 77ᵇ by engagement of the rod shoulders of slot 77ª therewith eliminates unintended excessive travel of rod 75 by adjustment of knob 113 such as might move lever 79 about its stem engaging end sufficiently to carry the trunnion shafts 88 or 92 into fulcruming engagement with the slot edge surfaces opposite the surfaces 86 or 90 respectively, which would reverse the movement of and open the valve member 20. It is also to be noted that in winter operation, Fig. 6, the extra compression of spring 74 by the power unit 55 which may even lift the spring seat member 73, serves to compensate for the otherwise lesser force opposing expansion of chamber 98 in this operation, i. e. in summer operation, expansion of chamber 98 is opposed by both of springs 23 and 74 while in winter operation the force of spring 23 is subtracted from the opposing force of spring 74.

The operation of the system and of the control valve is as follows: During summer operation or when cooling of the air in the space 1 is desired, a cold heat transfer medium will be supplied to the pipe 9 and be admitted to the interior of the valve casing through the inlet passage 34 and strainer 36. This medium such as water which may vary in temperature up to say, 70° F. will cool the temperature responsive power unit 55 so that the material 58 will be contracted thereby permitting the spring 53 to raise the fulcrum member 38 to the position shown in Fig. 5. The space air is at the desired low temperature limit and, therefore, the liquid in the bulb element 104 has permitted the spring 74 to move the operating rod 75 upward so that the operating lever 79 pivots on the fulcrum surfaces 86 and has moved the valve member 20 under the force of the spring 23 to closed position. Accordingly, flow of cooling liquid or water through outlet 19 to the supply pipe 6 to the heat transfer unit 3 is prevented. In this position of the parts, the by-pass valve member 28 will be in open position so that there will be a minimum flow of cooling water through the valve casing in order to maintain the power unit 55 in its collapsed or cooled position. This bypassed liquid discharging from the casing through the port 27 and outlet passageway 31 by-passes the heat exchange coil 3 and discharges directly to the return pipe 10 through the by-pass pipe 11. If the room or space temperature increases above 69° F. then the liquid in the bulb element 104 will expand and move the plunger 99 and the operating rod 75 downward so that the lever 79 will turn on its trunnions 88 on its surfaces 86 and lift the valve stem 21 against the force of the spring 23. The initial upward movement of the stem 21 will open the pilot valve 20ᵇ so that cooling water will flow from the supply pipe 9 through the valve casing and into the outlet 19 and thence through the pipe 6 to the coil 3 and therefrom through the return pipe 10. If the room temperature should continue to increase, then when the pilot valve 20ᵇ engages the spider 20ᵈ, the main valve portion 20ª will be picked up by the stem 21 and increase the port opening from the valve casing to the cooling unit supply pipe 6. The upward movement of the valve stem 21 moves the valve member 28 toward closed position thereby throttling or reducing by-pass flow through the port 27 and when the valve member 20 is in substantially full open position, the port 27 will be closed thereby directing all of the cooling water to and through the coil 3.

No manual operation of adjustment of the control valve is necessary in order to accomplish the change over for the heating cycle of the system. This has the advantage that under shiftable temperature conditions of the atmosphere as occurs in the late spring or early fall, the control valve will automatically accommodate itself for the particular heating or cooling cycle which it is to control. For the heating cycle of the system, warm or hot water will be supplied to the pipe 9 for admission to the interior of the control valve casing through the passageway 34 and the strainer 36 for contact with the power unit 55. It may be noted that the responsive material 58 is such that at a temperature of the heat transfer medium of say, 70° F. the supporting lever 38 will have the position of Fig. 5 whereas when the water is raised in temperature to say, 80° F., the material 58 will expand and move the supporting lever 38 to the position of Fig. 6. When the warm heat transfer medium has caused piston 60 to be moved outward from its casing, the supporting lever 38 will be moved downward to the position of Fig. 6 and be limited in its downward movement by engagement of the shoulder 52 with the stop disc 51. Since the adjustment of the supporting screw 49 is such that valve closing occurs at 71° F., this downward movement of the supporting lever 38 will have engaged the fulcrum surfaces 90 with the trunnions 92 of the operating lever 79 and will have rotated the lever 79 counterclockwise to bring the valve member 20 to one-half open position which corresponds to a room or space temperature of 69° F. If this open position of the valve member 20 supplies more than the necessary quantity of warm water to the coil 3 so that the space temperature starts to increase, then the expanding liquid in the bulb element 104 will move the operating member 75 downward and since the bearing surfaces 86 are out of the way of the trunnions 88, the lever 79 rotating on the surfaces 90 will move the valve member 20 toward closed position due to the force of the coil spring 23. If the space temperature should fall, however, then the spring 74 will move the operating rod 75 upward and rotate the lever 79 counterclockwise about its bearing surfaces 90, thereby lifting the valve member 20 further toward open position against the force of the spring 23 to increase the quantity or rate of flow of water to the coil 3. The by-pass port 27 will be open for flow of the warm water through the valve casing for all positions of the valve member 20 less than wide open position as above described in connection with the cooling cycle.

Referring to Figs. 7 and 8 there is shown a valve casing construction in which the form of the lower or bottom valve casing member is changed so as to permit drainage of the sump portion of the lower casing member within which the power unit 55 is positioned. In this form of casing the inlet passage 200 which is to be connected to the supply pipe 9 opens into a horizontal internally screw-threaded bore 201 through the casing side or end wall adjacent the casing bottom wall. Screw-threaded into and closing the outer end of the bore 201 there is a hollow strainer supporting plug 202 having a longitudinal bore 203 opening into the interior of the valve casing directly beneath the power unit casing 56 and connecting through radial ports 204 with the inlet passage 200. The plug 202 carries a cylindrical strainer 205 into which the bore 203 discharges. The strainer 205 has its free end open and received by a locating plug or screw 206 projecting from the inside wall of the casing. The plug 206 closes the open end of the strainer. In addition to cleaning and draining of the casing portion below the power unit 55 by unscrewing the plug 202 and removing the strainer 205, this construction directs the incoming heat transfer medium into direct contact with the power unit 55 so that the temperature responsive material 58 will be more certain of accurate and quick response to temperature changes. The operation of the control valve when the casing is constructed as in Figs. 7 and 8 will be apparent from the foregoing description and the description of the valve of Figs. 2 to 6, as the control valve mechanism is otherwise unchanged.

What is claimed and is desired to be secured by Letters Patent of the United States is:

1. A control device comprising a supporting structure, a lever, means carried by said structure and having simultaneously movable fulcrum surfaces spaced longitudinally of said lever, one of said fulcrum surfaces being engageable by said lever upon lever movement in one direction, the other of said fulcrum surfaces being engageable by said lever upon lever movement in the opposite direction, a lever supporting and operating member pivotally engaging said lever, movable means tending to hold said lever in one position and being movable by said lever subsequent to engagement of said lever with one or the other of said fulcrum surfaces, means to move said fulcrum surface means to position one or the other of said fulcrum surfaces for engagement by said lever, and a control means movable by said lever.

2. A control device comprising a movable supporting member, a lever, said supporting member having fulcrum surfaces spaced longitudinally of said lever, automatic means operable to move said supporting member to position one of said fulcrum surfaces for engagement by said lever upon lever movement in one direction, said automatic means being operable to move said supporting member to position the other of said fulcrum surfaces for engagement by said lever upon lever movement in the opposite direction, a lever supporting and operating member pivotally engaging said lever, movable means tending to hold said lever in one position and being movable by said lever subsequent to engagement of said lever with one or the other of said fulcrum surfaces, and a control means movable by said lever.

3. A control device comprising a supporting structure, a lever, means carried by said structure and having simultaneously movable fulcrum surfaces spaced longitudinally of said lever, one of said fulcrum surfaces being engageable by said lever upon lever movement in one direction, the other of said fulcrum surfaces being engageable by said lever upon lever movement in the opposite direction, a longitudinally reciprocal operating rod pivotally secured to and supporting said lever intermediate said fulcrum surfaces, means responsive to a characteristic of a fluid for reciprocating said rod, movable means tending to hold said lever in one position and being movable by said lever subsequent to engagement of said lever with one or the other of said fulcrum surfaces, means responsive to a characteristic of a fluid and operable to move said fulcrum surface means to position one or the other of said fulcrum surfaces for engagement by said lever, and a control means movable by said lever.

4. A control valve for regulating the flow of a heat transfer medium for cooling or heating operation, comprising a valve casing having an inlet and an outlet and a valve port, a valve member cooperable with said port, means urging said valve member in one direction, a lever engaging and operable to move said valve member in the opposite direction and against the force of said urging means, an operating and supporting member pivotally engaging said lever, movable fulcrum means for said lever alternately engageable with said lever, means to move said fulcrum means to and to hold said fulcrum means in said alternate positions for rotation of said lever in one direction or the other upon a single direction of movement of said operating member, said operating member on movement overcoming said urging means, and temperature responsive means to move said operating member.

5. A control valve for regulating the flow of a heat transfer medium for cooling or heating operation, comprising a valve casing having an inlet and an outlet and a valve port, a valve member cooperable with said port, means urging said valve member in one direction, an operating lever engaging and operable to move said valve member in the opposite direction and against the force of said urging means, an operating and supporting member pivotally engaging said lever, a supporting lever having fulcrum surfaces spaced longitudinally of said operating lever and alternately engageable with said operating lever on opposite sides of the pivoted engagement between said supporting member and said lever, means responsive to the temperature of the medium to move said supporting lever to position and hold said fulcrum surfaces in said alternate positions for rotation of said lever in one direction or the other upon a single direction of movement of said operating member, said operating member on movement overcoming said urging means, and temperature responsive means to move said operating member.

6. A control valve for regulating the flow of a heat transfer medium for heating or cooling operation, comprising a valve casing having an inlet and an outlet and a valve port, a valve member cooperable with said port, a spring urging said valve member to one position, a supporting lever having a fulcrum and having longitudinally spaced fulcrum surfaces, a valve operating lever engageable with said fulcrum surfaces and with said valve member, means responsive to the temperature of the heat transfer medium and operable to move said supporting lever, said responsive means positioning one of its fulcrum surfaces for engagement with said operating lever when subjected to a heating medium and positioning the other of its fulcrum surfaces for engagement with said operating lever when subjected to a cooling medium, an operating rod secured to and supporting said operating lever at a point between said fulcrum surfaces, and temperature responsive means for reciprocating said operating rod in accordance with the temperature of a medium subject to the heat transfer medium.

7. A temperature responsive valve for regulating the flow of heat transfer medium to an air conditioning unit, comprising a valve casing having an inlet and an outlet and containing a valve port, a reciprocable valve member movable to and from and operable to close said port, a stem on said valve member, a spring action on said stem and urging said valve member in one direction relative to said port, an operating lever having one end engaging said stem to move said stem against the force of said spring, an operating rod having one end secured to and supporting said lever, means responsive to the temperature of the space served by the unit and operable to reciprocate said rod, a fulcrum lever extending longitudinally of said operating lever and having longitudinally spaced fulcrum surfaces positioned on opposite sides of said operating rod, said fulcrum lever being oscillatable to engage one or the other of said fulcrum surfaces with said operating lever, and means responsive to the temperature of the heat transfer medium and operable to oscillate said fulcrum lever.

8. A temperature responsive valve, comprising a valve casing having a valve port, a valve member cooperable with said port and having open and closed positions, a spring urging said valve member to one of said positions, an operating lever having a plurality of fulcrums and having pivotal engagement with and operable to move said valve member against the force of said spring, an operating rod secured to and supporting said lever, a temperature responsive element operable on and for moving said rod in one direction, a spring opposing rod movement by said element, a fulcrum lever having fulcrum bearing surfaces positioned on opposite sides of said rod and alternately engageable by said operating lever fulcrums, temperature responsive means for moving said fulcrum lever for such alternate engagement, and means operable by said last-named responsive means to move said last-named spring to change its spring force opposing said element.

9. A temperature responsive valve for regulating the flow of heat transfer medium to an air conditioning unit, comprising a valve casing having an inlet and an outlet and containing a valve port, a reciprocable valve member movable to and from and operable to close said port, a stem on said valve member, a spring acting on said stem and urging said valve member in one direction relative to said port, an operating lever having one end engaging said stem and operable to move said stem against the force of said spring, an operating rod having one end secured to and supporting said lever, means responsive to the temperature of the space served by the unit and operable to reciprocate said rod, a fulcrum lever extending longitudinally of said operating lever and having longitudinally spaced fulcrum surfaces positioned on opposite sides of said operating rod, said fulcrum lever being oscillatable to engage one or the other of said fulcrum surfaces with said operating lever, a temperature responsive power unit containing expansible contractible material and carried by said fulcrum lever within said casing, said unit having a thrust rod movable by said material, abutment means engaged by said thrust rod, and a spring acting on said fulcrum lever in opposition to said unit and normally urging said fulcrum lever to position one of said fulcrum surfaces in engagement with said operating lever, said unit acting upon temperature change of the medium to overcome said last-named spring and to position the other of said fulcrum surfaces in engagement with said operating lever.

10. A temperature responsive valve for regulating the flow of heat transfer medium to an air conditioning unit, comprising a valve casing having an inlet and an outlet and containing a valve port, a reciprocable valve member movable to and from and operable to close said port, a stem on said valve member, a spring acting on said stem and urging said valve member to close said port, said casing having a by-pass outlet port, said stem having a valve portion controlling flow through said by-pass port, said valve portion being held in open position by said spring when said valve member is closed, said valve portion being moved toward by-pass port closing position upon opening of said valve member, an operating lever having one end engaging said stem, an operating rod having one end secured to and supporting said lever, means responsive to the temperature of the space served by the unit and operable to reciprocate said rod, a fulcrum lever extending longitudinally of said operating lever and having longitudinally spaced fulcrum surfaces positioned on opposite sides of said operating rod, said fulcrum lever being oscillatable to engage one or the other of said fulcrum surfaces with said operating lever, and means responsive to the temperature of the heat transfer medium and operable to oscillate said fulcrum lever.

11. A control valve for regulating the supply of a liquid heat transfer medium to a space conditioning unit, comprising a valve casing having an inlet and an outlet and a valve port, a valve member in said casing and controlling flow through said port, means urging said valve member in one direction, an operating lever acting on said valve member, means responsive to the temperature of the space and acting on and through said lever to overcome said urging means thereby to move said valve member in the opposite direction, a movable fulcrum member supporting said operating lever, and means responsive to the temperature of the liquid medium in said casing and operable to move said fulcrum member for valve member movement in said one direction irrespective of operation by said first-named responsive means for valve member movement in said opposite direction.

12. A control valve for regulating the supply of a liquid heat transfer medium, comprising a valve casing having a bottom wall and having an inlet passage opening horizontally thereinto adjacent said wall, a cylindrical strainer in said casing and receiving the liquid medium from said passage, a temperature responsive power unit positioned above said screen for contact with the incoming liquid medium, a supporting lever movable by said unit, an operating lever to be fulcrumed on said supporting lever, means responsive to temperature external of said casing and operatively connected to said operating lever, said casing having an outlet with a valve seat, a valve member cooperable with said seat and operatively connected to said operating lever, and cooperable pairs of fulcrum members on said levers on both sides of the connection between said temperature responsive means and said operating lever to pivotally support said operating lever on said supporting lever, said power unit changing the position of said supporting lever so as to fulcrum said operating lever on one or the other of said pairs of fulcrum members thereby to reverse valve member movement relative to temperature responsive means movement.

13. A control valve for regulating the supply of a liquid heat transfer medium to a space conditioning unit, comprising a valve casing having separable hollow top and bottom members with abutting joint surfaces, means clamping and sealing said surfaces together to prevent leakage from said casing, said bottom member having an outlet passage with a valve port having an upward facing valve seat, said top member having a guide member alined with said port, a valve member engageable with said seat and having a stem reciprocable in said guide member, a collar on said stem, a helical spring surrounding said guide member and seating on said collar to urge said valve member to closed position on said seat, a trough-shaped supporting lever having side member extensions positioned on opposite sides of said stem, a bearing shaft extending through said extensions and carried by said top member, the side members of said supporting lever having longitudinally spaced pairs of opposed apertures providing edge fulcrum surfaces, an operating lever positioned between said side members and having one end engaging said stem collar, pairs of fulcrum arms projecting laterally from said operating lever and engageable with said fulcrum surfaces, an operating rod pivotally secured to said operating lever and spaced from and between said arms, said rod extending upward and having a spring receiving flange adjacent the top wall of said top member, a guide plate member for said rod spaced from said flange and carried by said top member, a spring abutment member surrounding said rod and seating on said guide plate member, a helical spring surrounding said rod and held under compression between said abutment member and said flange, abutment pins positioned at the sides of said rod and extending downward from and being rigid with said abutment member, a lever plate extending longitudinally of and pivotally engaging said supporting lever at its end opposite said shaft, said lever plate seating upward against said abutment pins, a temperature responsive power unit having a rigid casing secured in and through the base flange of said supporting lever, said unit having a chamber, expansible material in said chamber, a thrust rod supported on said material and extending from said unit into abutting engagement with said lever plate, a supporting screw carried by and extending downward within said top member, an abutment disc adjustably screw threaded on said screw, a helical spring surrounding said screw and seating on said disc, a cylinder slidable on said screw and surrounding said last-named spring, said cylinder having an internal shoulder engageable by said disc and having an end wall seating on said last-named spring, an adjustable stop member carried by said top member and engageable by said cylinder end wall to limit expansion of said last-named spring, means pivotally securing said cylinder to the side members of said supporting lever, said cylinder shoulder engaging said disc to limit movement of said supporting lever by said power unit, means responsive to the temperature of the space to be conditioned and operatively connected to said operating rod to move said operating lever, said top member having a by-pass outlet with a valve port alined with said valve stem, and a valve member on said stem and controlling flow through said by-pass port.

14. A temperature responsive valve comprising a valve casing having a port, a valve member controlling said port, a lever for operating said valve member, a thermostatic power element responsive to temperature external of said valve casing, a thrust member for transmitting movement from said power element to said lever, and means including a thermostatic power element responsive to the temperature of the fluid supplied to said casing and operable to shift the relation of the thrust member to the lever fulcrum so that the rotation of said lever by said first-named power element is reversed.

15. A temperature responsive valve for regulating the flow of heating and of cooling medium to a heat exchange element, comprising a valve casing having a valve port, a valve member cooperable with said port, a lever for moving said valve member, means responsive to temperature external of said casing and operable to move said lever, and means responsive to the temperature of the medium supplied to said casing and operable upon the medium temperature crossing a predetermined range of temperature to reverse the direction of rotation of said lever by one-direction movement of said external responsive means.

16. A temperature responsive valve for regulating the flow of heating and of cooling medium to a heat exchange element, comprising a valve casing having a valve port, a valve member cooperable with said port, a lever for moving said valve member, means responsive to temperature external of said casing and operable to move said lever, means responsive to the temperature of the medium supplied to said casing and operable upon the medium temperature crossing a predetermined range of temperature to reverse the direction of rotation of said lever by one-direction movement of said external responsive means, and means determining the positions of said valve member relative to said port for a given temperature of said external responsive means when the temperature of said medium is below said predetermined range and when the temperature of said medium is above said predetermined range.

17. A temperature responsive valve for regulating the flow of heating and of cooling medium to a heat exchange element, comprising a valve casing having a valve port, a valve member cooperable with said port, a lever for moving said valve member, means responsive to temperature external of said casing and operable to move said lever, means responsive to the temperature of the medium supplied to said casing and operable upon the medium temperature crossing a predetermined range of temperature to reverse the direction of rotation of said lever by one-direction movement of said external responsive means, adjustable means cooperable with said last-named responsive means and operable to determine the position of said valve member relative to said port for a given temperature of said external responsive means when cooling medium is supplied to said valve casing, and adjustable means cooperable with said last-named responsive means and operable to determine the position of said valve member relative to said port at said given temperature of said external responsive means when heating medium is supplied to said valve casing.

18. A control valve for regulating the supply of a liquid heat transfer medium, comprising a valve casing having an inlet passage, a temperature responsive power unit positioned for contact with the incoming liquid medium, a supporting lever movable by said unit, an operating lever to be fulcrumed on said supporting lever, means responsive to temperature external of said casing and operatively connected to said operating lever, said casing having an outlet with a valve seat, a valve member cooperable with said seat and operatively connected to said operating lever, cooperable pairs of fulcrum members on said levers on both sides of the connection between said temperature responsive means and said operating lever to pivotally support said operating lever on said supporting lever, said power unit changing the position of said supporting lever so as to fulcrum said operating lever on one or the other of said pairs of fulcrum members thereby to reverse valve member movement relative to temperature responsive means movement, an adjustable abutment member cooperable with and to stop movement of said supporting member in one direction to determine the position of said valve member for a given temperature of said external temperature responsive means, and an adjustable abutment member cooperable with and to stop movement of said supporting member in the opposite direction to determine the position of said valve member at said given temperature of said external temperature responsive means.

19. In an air conditioning system, the combination of an air conditioning unit containing a heat exchange member, a first line for the passage of conditioning medium to said member, a second line for withdrawing conditioning medium from said member, a valve in said first line to meter the amount of conditioning medium passing to said member, said valve including a housing having a passage therethrough, means for opening and closing the passage, thermostatic means for actuating said means in response to a change in temperature in an area being conditioned, a movable element for controlling movement of said opening and closing means, second thermostatic means for actuating said element in response to a change in temperature of the conditioning medium, said element being placed in a first position to determine the direction of movement of the opening and closing means when medium of a predetermined condition enters the housing and in a second position to change the direction of movement of the opening and closing means when medium of a different condition enters the housing, and a by-pass connecting said housing with said second line to permit passage of conditioning medium through the housing to the second line without passage through the heat exchange member of said unit.

EARNEST J. DILLMAN.

REFERENCES CITED

The following references are of record in the file of this patent:

UNITED STATES PATENTS

| Number | Name | Date |
|---|---|---|
| 2,285,513 | Harris | June 9, 1942 |
| 2,310,293 | Joesting | Feb. 9, 1943 |
| 2,353,889 | Giesler | July 18, 1944 |